(No Model.)
J. T. HAMMICK.
CAR COUPLING.
No. 338,405. Patented Mar. 23, 1886.
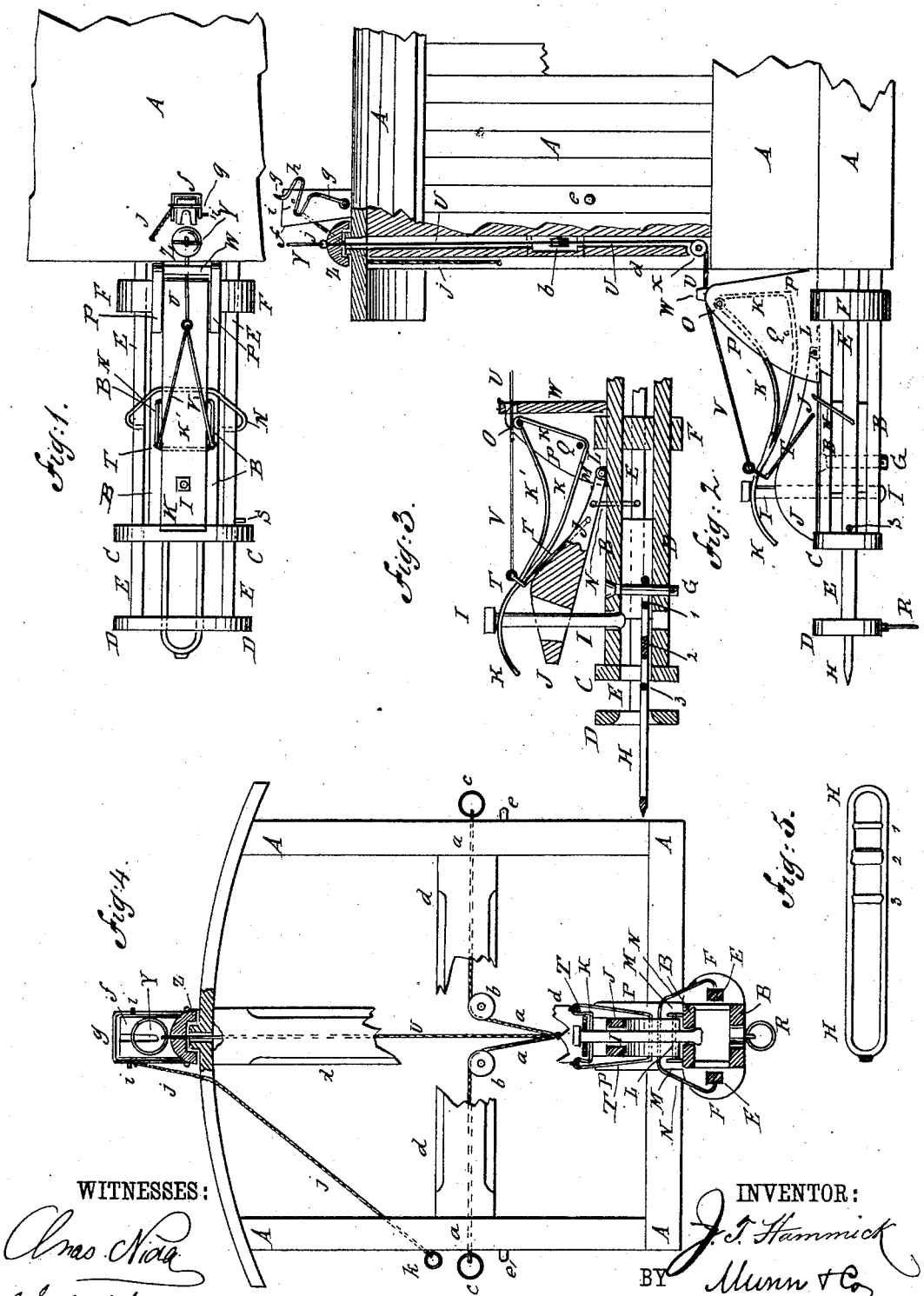
WITNESSES:
INVENTOR:
J. T. Hammick
BY Munn & Co.
ATTORNEYS.

UNITED STATES PATENT OFFICE.

JOSEPH T. HAMMICK, OF RHINEBECK, NEW YORK.

CAR-COUPLING.

SPECIFICATION forming part of Letters Patent No. 338,405, dated March 23, 1886.

Application filed September 7, 1885. Serial No. 176,451. (No model.)

*To all whom it may concern:*

Be it known that I, JOSEPH T. HAMMICK, of Rhinebeck, in the county of Dutchess and State of New York, have invented new and useful Improvements in Car - Couplings, of which the following is a full, clear, and exact description.

Reference is to be had to the accompanying drawings, forming part of this specification, in which similar letters of reference indicate corresponding parts in all the figures.

Figure 1 is a plan view of a part of one of my improved car-couplings, shown as attached to a car, parts of the car being broken away. Fig. 2 is a side elevation of the same, part of the car being shown in section. Fig. 3 is a sectional side elevation of a part of the coupling. Fig. 4 is a sectional front elevation of the coupling, shown as attached to a car and parts of the car being broken away. Fig. 5 is a plan view of one of the coupling-links.

The object of this invention is to improve the construction of the car-couplings for which Letters Patent No. 321,598 were issued to me July 7, 1885, in such a manner as to make them more convenient in use and more reliable in operation.

The invention consists in the construction and combination of various parts of the car-coupling, as will be hereinafter fully described, and then pointed out in the claims.

A represents the body of the car, with which the draw-bar B is connected in the ordinary manner.

To the forward end of the draw-bar B is secured the stationary draw-head C, against the forward side of which fits a movable draw-head, D.

To the side parts of the movable draw-head D are attached the forward ends of two rods, E, which pass back through guide-holes in the side parts of the stationary draw-head C, and in the block or lugs F, formed upon or attached to the sides of the rear part of the draw-bar B.

G is the stationary coupling - pin, which passes through a hole in the forward part of the coupling-bar B through the end of the coupling-link H, and is secured in place by a key or other suitable means.

The coupling-link H is divided into four sections by the cross-bars 1 2 3, all of which are placed in the rear of its center, as shown in Fig. 5, so as to leave a long opening in its forward part to give it the necessary play upon the coupling-pin of the adjacent car.

The inner or rear end of the coupling-link H is weighted or made heavy to overbalance the outer or forward end, and thus hold the link securely in a horizontal position when uncoupled.

I is the movable coupling-pin, which passes through a hole in the forward part of the draw-bar B a little in front of the stationary pin G. The upper part of the coupling-pin I passes through a flaring hole in the forward end of the lifting-block J, and is secured to the forward end of the lifting-plate K. The rear end of the lifting-plate J is hinged to the rear part of the draw-bar B by a rod or bolt, L, passing through the said rear end and through eyebolts or staples M, secured to the said draw-bar B, or by some other suitable means.

Through a hole in the lifting-block J, at a little distance from its rear end, is passed the middle part of a rod, N, the end parts of which are bent downward, and their ends are bent inward and inserted in holes in the sliding bars E, or are otherwise pivoted to the said bars. The arms of the bent rod or bail N are made of such a length that the lifting-block J will be upon the upper side of the draw-bar B when the sliding bars E are at the forward end and at the rear end of their movement, and will be at its highest point of elevation when the said sliding bars are at the central point of their movement. The rear end of the lifting-plate K is bent upward at right angles, and is pivoted to a rod or bolt, O, the ends of which are secured to the upper parts of posts or flanges P, formed upon or attached to the sides of the rear part of the draw-head B. When the lifting-plate K is made light, its bent rear part may be strengthened by an inclined brace, K', formed upon or attached to it, as shown in Figs. 2 and 3.

The rise of the forward end of the lifting-plate K is limited by a rod or bolt, Q, attached to the flanges P in such a position that the angle of the said plate will come in contact with the said rod or bolt when the said plate is raised to the required height. With this construction, when cars are to be coupled, the movable draw-heads D and the sliding bars E are drawn forward by means of rings R or other handles attached to the lower edges of the said draw-heads into the position shown in Figs. 1 and 2. Then as the cars are run together the links of the adjacent cars enter the openings in the movable draw-heads D, and the said movable draw-heads are pushed back by each other. The rearward movements of the draw-heads D raise the lifting blocks and plates J K and the movable coupling-pins I, and as the forward ends of the entering links H pass the said pins I the said pins and lifting blocks and plates are again lowered, the pins I passing through the said links. The cars will thus be coupled by two links H, the rear ends of which are held by the stationary pins G and their forward ends by the movable pins I. The forward ends of the links H are beveled or made wedge-shaped, as shown in Figs. 1, 2, 3, and 5, to cause them to pass each other without being obstructed. With this construction a link H and movable pin I are permanently connected with each draw-bar, so that the links and pins can never be lost.

The forward movement of the draw-head D and bars E is limited by stop-pins S, attached to the said bars E, and which come in contact with the rear side of the stationary draw-head C.

To the rear parts of the side edges of the lifting-block J are pivoted the ends of a bail, T, the bend of which passes beneath the lifting-plate K a little in the rear of the coupling-pin I. To the angles of the bail T are attached the branched ends of a cord or chain, U, or the ends of two short rods, V, attached at their other ends to the said cord or chain U. The cord U passes through a guide-hole formed in the upper part of the upright plate W, attached to the draw-bar B and flanges P, or around a guide-pulley connected with the said plate. From the plate W the cord or chain U passes around a pulley, X, pivoted to a support at the lower edge of the end of the car-body A, passes up along the end of the car-body, through a guide tube or hole in the roof of the said car-body, and to its upper end is attached a ring, Y, or other handle, for convenience in operating the said cord or chain.

To the upper end of the cord or chain U is also attached a cap, Z, to cover the hole through the car-roof, to prevent it from becoming filled with snow, ice, or other obstruction, and the free movement of the said cord or chain prevented.

To the cord or chain U, at the lower part of the end of the car-body A, are attached the ends of two cords or chains, a, which pass over two guide-pulleys, b, pivoted to the end of the said car-body at the opposite sides of the said cord or chain U. The cords or chains a pass along the end of the car-body A and through guide-holes at the sides of the said car-body A, as indicated in Fig. 4, and to the ends of the said cords or chains are attached rings c, for convenience in operating the said cords or chains. By this construction, by operating the cords U or a from the top or either side of the car, the bail N will be operated to raise the lifting-plate K and the coupling-pin I for uncoupling the cars. The pulleys and the cords or chains at the end of the car-body are covered and protected by caps d, attached to the said end.

To the sides of the car-body are attached knobs e for the rings c to be caught upon when it is desired to hold the lifting-plate K and the pin I raised to prevent the cars from coupling when run together, or to allow cars standing together to be drawn apart when desired.

To the top of the car-body, in the rear of the cord or chain U, is attached a short standard, f, the forward side of which is slotted to receive the cord or chain U, so that the cap Z can be placed on top of the said standard f when it is desired to fasten the lifting-plate K and the pin I in a raised position from the top of the car.

To the lower parts of the sides of the standard f are pivoted the ends of a bail, g, the bend of which passes over the top of the standard f. The arms of the bail g, near their upper ends, are bent to form recesses h, to receive stop-pins i, attached to the sides of the standard f, to limit the forward movement of the said bail.

To the upper part of the bail g is attached the end of a cord or chain, j, which passes through guide-holes in the roof and sides of the car-body, and has a ring, k, attached to its end, so that by pulling upon the cord or chain j from the side of the car the bail g will be drawn forward, and will push the cap Z off the standard f, allowing the lifting-plate K and the coupling-pin I to drop into place.

When moving cars to and from the side tracks in making up and breaking a train, one of the lifting-plates K and pins I can be fastened in a raised position, so that only one link will operate.

Having thus described my invention, I claim as new and desire to secure by Letters Patent—

1. In a car-coupling, the combination, with the draw-bar B, the stationary draw-head C, the movable draw-head D, the sliding bars E, the hinged lifting-block J, the hinged bail N, connecting the said hinged lifting-block and sliding bars, the hinged lifting-plate K, the movable coupling-pin I, connected with the said lifting-plate, and the link H, of the stationary pin G, substantially as herein shown and described, whereby the coupling-link is permanently connected with the draw-bar, as set forth.

2. In a car-coupling, the combination, with the hinged block J, the lifting-plate K, and the coupling-pin I, connected to said plate, of the bail T, hinged to the block J and having its bend under the plate K, the cords or chains U V a, and the guide-pulleys b X, substantially as herein shown and described.

3. In a car-coupling, the combination, with the car-body A, the hinged lifting-plate K, the coupling-pin I, the hinged bail T, the cord or chain U, and its cap Z, of the slotted standard f, the hinged bail g, having recesses h in its arms, the stop-pins i, and the cord j, substantially as herein shown and described, whereby the said lifting-plate and coupling-pin can be raised and locked in a raised position and can be released from the top or sides of the car, as set forth.

4. In a car-coupling, the coupling-link H, made, substantially as herein shown and described, with a weighted inner end, a wedge-shaped outer end, and with three cross-bars dividing it into four sections, whereby the said link can be permanently connected with a draw-bar, and will be held in a horizontal position when uncoupled, as set forth.

JOSEPH T. HAMMICK.

Witnesses:
   GEO. ESSELSTYN,
   JAMES C. MCCARTY.